United States Patent Office 3,394,912
Patented July 30, 1968

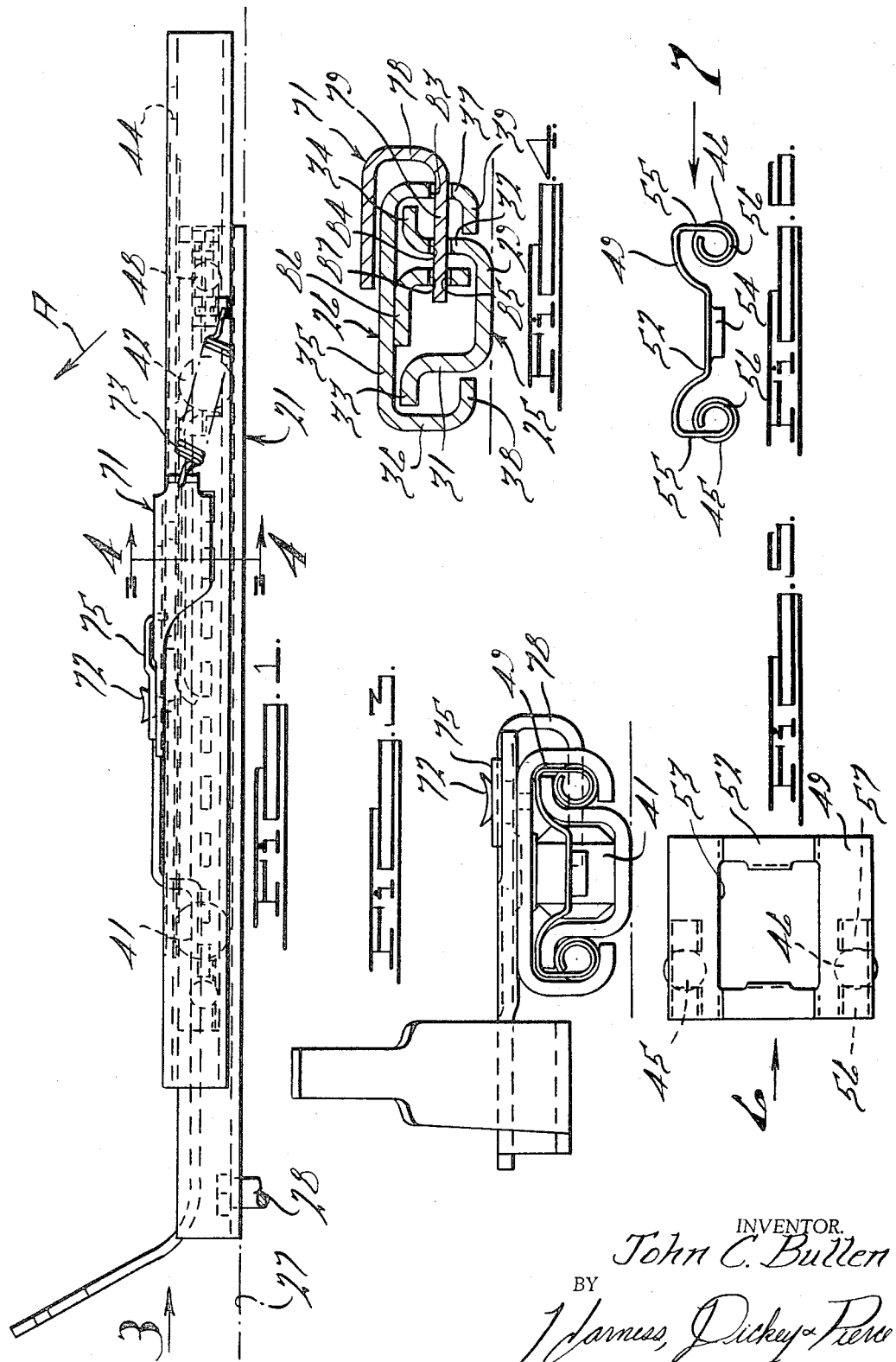

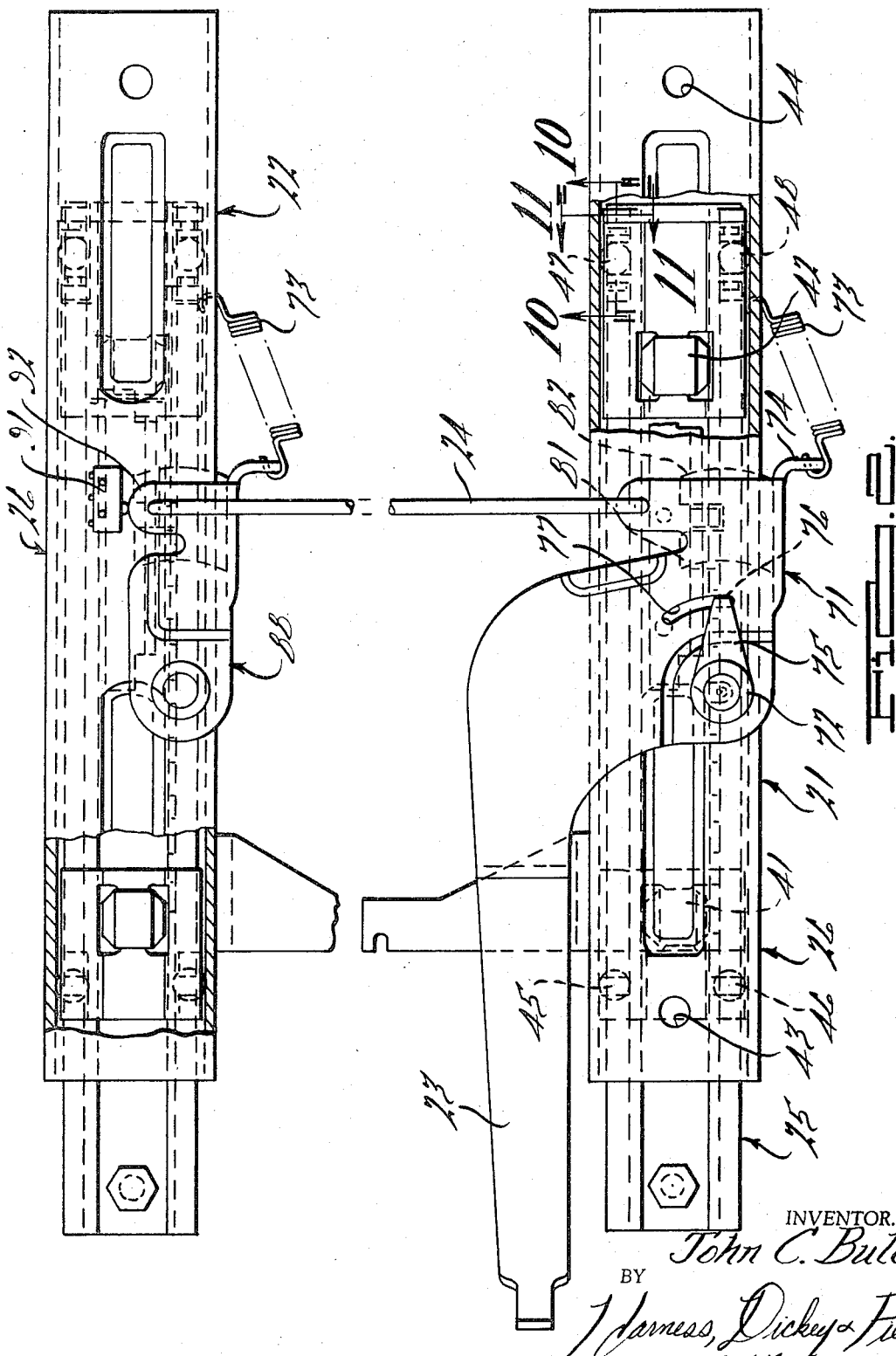

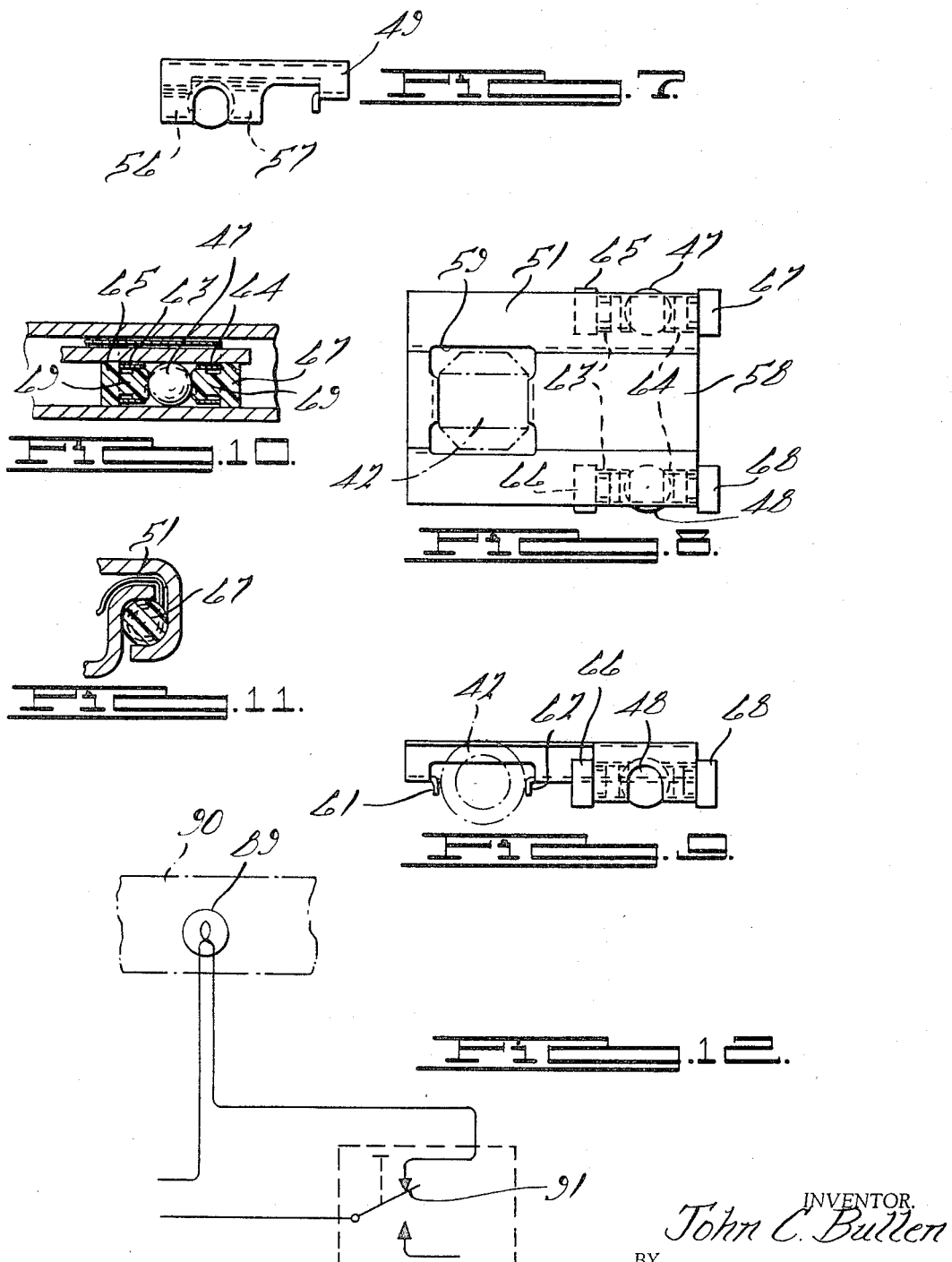

3,394,912
SEAT SLIDE ASSEMBLY FOR
AUTOMOTIVE VEHICLES
John C. Bullen, Jackson, Mich., assignor to Hancock
Industries, Inc., Jackson, Mich., a corporation of
Michigan
Filed Aug. 30, 1966, Ser. No. 576,108
10 Claims. (Cl. 248—430)

ABSTRACT OF THE DISCLOSURE

A seat support assembly for use where seat belts are carried by the seat frame or slide member. The assembly comprises a lower U-shaped track member slidably carrying an inverted U-shaped slide member with load distributing means therebetween. A latch member mounted for horizontal movement engages apertures formed in the sides of the track and slide and also in a bracket carried by the slide thereby providing high resistance to separation of the slide from the track in the event of a crash.

---

This invention relates to seat slide assemblies for automotive vehicles, and particularly those in which front seat belts or harnesses are secured to the seat frame or upper seat slide member.

It is an object of the invention to provide a novel and improved seat slide assembly for vehicles of this type which will offer high resistance during a crash to forces tending to separate the upper seat slide member from the lower member.

It is another object to provide an improved seat slide assembly of this nature which is particularly suited for vehicles having low profiles or roof lines, and will preserve passenger height room.

It is also an object of the invention to provide an improved seat slide assembly of this character in which the slide latch serves the additional function of interconnecting the upper and lower slide members in such fashion as to prevent separation thereof during crashes.

It is a further object to provide an improved seat slide assembly having these characteristics, in which novel means are provided between the upper and lower slide members for distributing the forces tending to separate them during a crash, so that these forces may be better resisted.

It is another object of the invention to provide an improved seat slide assembly having these characteristics, in which a visual indication may be given to the driver when the slide latch is not fully in its latching position.

The manner of accomplishing the foregoing objects and other objects and features of this invention will become apparent from the following description of embodiments of the invention when read with reference to the accompanying drawings, in which:

FIGURE 1 is a side elevational view of a seat slide assembly of this invention;

FIGURE 2 is a top plan view of a left hand and a right hand slide assembly, parts being broken away for clarity;

FIGURE 3 is a front elevational view of one of the assemblies taken in the direction of the arrow 3 of FIGURE 1;

FIGURE 4 is a cross-sectional view of the assembly taken along the line 4—4 of FIGURE 1 and showing the location of the auxiliary latching bracket;

FIGURE 5 is a top plan view of the forward roller and ball cage;

FIGURE 6 is a front elevational view of the cage of FIGURE 5;

FIGURE 7 is a side elevational view of the cage;

FIGURE 8 is a top plan view of the rear roller and ball cage showing the location of the load distributing slides;

FIGURE 9 is a side elevational view of the cage of FIGURE 8;

FIGURE 10 is a fragmentary cross-sectional view taken along the line 10—10 of FIGURE 2 and showing the disposition of the load distributing slides between the upper and lower tracks;

FIGURE 11 is a fragmentary cross-sectional view taken along the line 11—11 of FIGURE 2 and showing the engagement of a load distributing slide between the track and slide; and FIGURE 12 is a circuit diagram showing the manner in which a visual signal is given to the operator when the latch is not in its fully latched position.

Briefly, the illustrated embodiment of the invention comprises a lower fixed track of U-shaped cross section having outwardly extending upper flanges and an upper slide of inverted U-shape having inwardly extending flanges disposed below the flanges of the track. Rollers are disposed between the webs of the track and slide to support the load of the seat and passengers, and sets of forward and rear balls are disposed between the flanges of the track and slide to prevent upward movement of the slide with respect to the track. Forward and rear cages are provided for maintaining the balls in proper location, and to guide the rollers.

The track and slide are so shaped as to occupy a minimum amount of height, thus being especially useful in cars with low roof lines which require correspondingly lower seats. The assembly is also particularly adapted to be used with those seat installations in which safety belts or harnesses are secured to the seat frame or to the slide. In such installations, the momentum of the passengers and seat during a crash will have a strong tendency to cause separation of the slide from the track. In low profile seat slide assemblies of the type contemplated by this invention, having facing flanges on the two tracks, this separating force results in the track and slide flanges tending to be bent by the presence of the balls between them which in effect act as cams.

As part of the present invention, a pair of load distributing members are carried by the rear cage on either side of each of the two balls retained by the cage. These members are of a low friction material such as nylon and are in the form of cylindrical buttons of slightly smaller diameter than the balls. Upon slight outward flexure of the slide flanges, these buttons will be engaged with the track flanges. This will cause the "peeling" or spreading load exerted on the slide flanges to be distributed along a much greater extent of the slide, so that the unit stress tending to distort the flanges will be considerably less.

As another feature of the invention, a latch is pivotally mounted on the slide adjacent the rearward portion thereof, and has a plurality of teeth which are receivable by the vertical walls of the track and slide and also by an auxiliary latching bracket secured to the inside of the slide. The track has a series of apertures for receiving the latch, so that the position of the seat may be adjusted. Each tooth of this latch will therefore be subjected to shear loads on cross-sectional areas thereof upon exertion of a force on the slide in an inclined direction, such as would occur due to the momentum of the seat and passengers wearing seat belts during a crash. The latch is carried adjacent the rear portion of the slide, and since the separating forces between the track and slide are greatest at the rearward end of the assembly, these forces will be resisted to a high degree by the interlocking action of the latch in this manner.

Still another feature of the invention is the provision of a limit switch mounted on the slide and engageable by a portion of the latch when it reaches its latching position. This limit switch is connected in series with an indicator lamp mounted on the dashboard of the vehicle so that the driver may be warned when the latch is not in its fully latching (and therefore safety) position.

Referring more particularly to the drawings, a pair of seat slide assemblies generally indicated at 21 and 22 are shown in FIGURE 2, slide assembly 21 being visible in FIGURE 1. These are left hand and right hand slide assemblies respectively, and are basically of the same construction, the only difference being in the shape of the latch, that for the left hand assembly having a handle 23 so as to be operable by the driver. A link 24 connects the two latches in a conventional manner, so that they will move in unison. The remaining description may be limited to slide assembly 21 since the invention appears in the same manner in both assemblies.

The assembly comprises a track generally indicated at 25 and a slide generally indicated at 26. Track 25 is adapted to be secured to the floor 27 of the vehicle (FIGURE 1) by fasteners 28. The track is of U-shaped cross section with outwardly extending upper flanges. More particularly, it has a bottom web 29 (FIGURE 4), upwardly extending walls 31 and 32 and outwardly extending flanges 33 and 34 at the upper ends of these walls. The junctures between these portions of the track are provided with radii so as to be curved rather than sharp.

Slide 26 is of inverted U-shaped construction with inwardly directed flanges. More particularly, it has an upper web 35 disposed above and extending to both sides of flanges 33 and 34 of the track. A pair of downwardly extending walls 36 and 37 are provided at the opposite sides of web 35, these walls being spaced outwardly from the outer edges of flanges 33 and 34. A pair of inwardly directed flanges 38 and 39 are formed at the lower edges of walls 36 and 37 respectively, these flanges being disposed a substantial distance below flanges 33 and 34. As in the case of the track, the junctures of the web and flanges with the walls have radii of curvature.

Two rollers 41 and 42 are disposed between the track and slide, these rollers being adjacent the forward and rear ends of the assembly respectively. The rollers engage webs 29 and 35 so as to transmit bearing loads exerted on the slide by the weight of the seat and passengers. The slide is securable to the seat frame (not shown) by fasteners extending through apertures 43 and 44 at the forward and rear ends of the slide respectively (FIGURE 2).

A pair of forward balls 45 and 46 and a pair of rearward balls 47 and 48, are provided between the overlapping flanges of the track and slide. These balls occupy the spaces between these flanges as seen in FIGURES 3 and 10, so as to take up any play between the track and slide which might tend to cause rattling during use, and to act as anti-friction devices for convenience and ease of movement between the slide and track.

Forward and rear cages 49 and 51 respectively are provided for retaining the forward roller and balls and the rear roller and balls in proper position. The construction of the forward ball and roller cage 49 is seen best in FIGURES 5 and 6. It comprises a sheet metal member having a web portion 52 with a central cutout 53 and a depression as seen in FIGURE 6, with tabs 54 engageable with roller 41. The sides 55 of cage 49 extend downwardly as seen in FIGURE 6 and are provided with spaced curved portions 56 and 57 (FIGURE 5), balls 45 and 46 being disposed between these curved portions of the cage. The balls are loosely retained by the cage but may not move fore or aft with respect to roller 41 in view of the fact that the cage guides all three members. The thickness of the sheet metal from which the cage is fabricated is substantially less than the spacing between the track and slide, so that the cage may extend between these members as seen in FIGURE 3.

Rear ball and roller cage 51 (FIGURE 8) is somewhat longer than cage 49 but is similarly constructed in its cross-sectional shape, in that it has a depressed central portion 58 with an aperture 59 within which roller 42 is disposed. The roller is engaged by a pair of tabs 61 and 62 (FIGURE 9) at the forward and rearward ends of aperture 59.

The retaining portions for balls 47 and 48 are curved as seen in FIGURE 11, these portions being indicated at 63 and 64 respectively in FIGURE 8. Curved portions 63 are disposed forwardly of balls 47 and 48 respectively, and curved portions 64 are located rearwardly of the balls. The radius of curvature of portions 56 and 57 of cage 49 and of portions 63 and 64 of cage 51 are substantially less than the radius of the balls so that these curved portions of the cage will not interfere with relative movement between the slide and track.

Four load distributing members are carried by cage 51, two of these members 65 and 66 being disposed forwardly of balls 47 and 48 respectively, and two members 67 and 68 being disposed rearwardly of the balls. These are cylindrical members of slightly lesser diameter than the diameter of the balls. They have extensions 69 of smaller diameter than the main portions, the extensions being retained within the curved portions 63 and 64 of the cage, as seen in FIGURE 10.

The latch for the left hand seat slide assembly is indicated generally at 71 and is pivotally mounted by a pin 72 to the top of slide 26 adjacent one side thereof and at the rearward portion of the slide. Latch 71 is urged in a counterclockwise direction as seen in FIGURE 2 by a coil spring 73 connected between a tab 74 on the latch and slide 26. A stop 75 is provided above latch 71, this stop having a portion 76 disposed within a curved slot 77 of the latch (FIGURE 2) to limit its movement in either direction.

The latch has a downwardly extending portion 78 outside wall 37 of the slide, and a toothed portion 79 extends inwardly from the lower end of this portion 78. Toothed portion 79 of the latch has a pair of teeth indicated at 81 and 82 in FIGURE 2. Portion 79 passes through a slot 83 in wall 37 of the slide, and teeth 81 and 82 extend through apertured portions 84 in wall 32 of track 25. Apertures 84 are equidistantly spaced penetrations in wall 32, so that the upper track may be adjusted in any of a variety of positions by first withdrawing teeth 81 and 82 from a pair of apertures 84 and moving the track until the teeth come into alignment with another pair of apertures 84.

An auxiliary latching bracket 86 (FIGURE 4) is secured to the inside of slide 26. This bracket is of L-shaped formation and its upper horizontal leg is welded to the underside of web 35 of slide 26, the vertical leg extending downwardly parallel to and spaced slightly from wall 32 of track 25. The spacing is such that teeth 81 and 82 will enter a pair of apertured portions 87 in the vertical leg of bracket 86.

In operation, the seat slide assembly may be adjusted by rotating latch 71 (and thereby its counterpart latch 88 on the right hand slide assembly) clockwise in FIGURE 2, thereby withdrawing teeth 81 and 82 of each latch from its bracket 86 as well as its track 25. While in this position, the slides may be adjusted forwardly or rearwardly. The latches may then be released and will be urged by springs 73 to their latching position. In this position, teeth 81 and 82 will enter any adjacent pair of apertures 84 in lower track walls 32, and apertures 87 in brackets 86.

It will thus be seen that latches 71 and 88 act as shear-resistant interlock members between the tracks and slides. More particularlly, shear areas will be presented by those portions of the latches which pass through apertures 83, 84 and 87.

In cases where a seat belt or harness is attached to the slide or to a seat frame secured to the slide, inertial forces created during a crash will have a tendency to lift the rearward end of the slide at an angle of perhaps 45°, as indicated by the arrow A in FIGURE 1. These forces will be resisted by both the latches 71 and 88 and by the rear balls 47 and 48 together with load distributing members 65 through 68.

More particularly, the auxiliary bracket 86 and wall 37 of each slide 26 will tend to force the corresponding latch in the direction of arrow A, and this will be resisted by the fact that the latch, and more particularly its teeth 81, 82, will pass through apertures 84 in wall 32 of track 25. Shear areas of substantial size will thus be presented to resist the forces involved.

In addition, the upward force on slide 26 will tend to cause walls 36 and 37 as well as flanges 38 and 39 to spread apart in a lateral direction, due to the presence of balls 47 and 48 which will have a camming effect. At the same time, walls 31 and 32, and flanges 33 and 34, of track 25, will be forced inwardly by this same effect. If the slide is dislodged from the track, this could cause serious harm because resistance to further movement would be greatly lessened.

It will be noted that balls 47 and 48 have merely line contact with the flanges of the track and slide, and the unit stresses on those portions of the slide tending to distort under the load would ordinarily be quite high due to this small contact area. However, in this case the four cylindrical load distributing members 65 through 68 will engage the flanges of the track and slide upon slight flexure of the slide. This will distribute the loads tending to collapse the track and spread apart the slide over much wider areas and the unit stress in those portions of the track and slide will be correspondingly lessened. There will therefore be much less possibility of the slide becoming dislodged from the track.

The invention also contemplates the provision of a signal lamp 89 (FIGURE 12) which could be mounted on a dashboard indicated in dot-dash lines at 90 so as to warn the motorist that the latch is not in its fully latched position. This lack of full latching position for the latch would be an unsafe condition because the shear areas would then not be fully available so as to counteract the crash forces discussed above. In the present instance, a limit switch 91 is mounted on slide 26 (FIGURE 2) of one of the slide assemblies, say the right hand side assembly. This limit is shown schematically in FIGURE 12 as being connected in series with lamp 89. Ordinarily, when latch 88 is in its fully latched position, a portion 92 thereof will engage switch 91, thereby moving it to its open position so that lamp 89 will be extinguished. Whenever switch 91 is not moved to its open position by latch 88, lamp 89 will be illuminated.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In an automotive seat slide assembly, an elongated track having a central lower portion, sides extending upwardly from the opposite edges of said lower portion, and outwardly extending flanges at the upper ends of said sides, a slide having an upper central web portion above said flanges, sides extending downwardly past said flanges, and inwardly extending flanges at the lower ends of said sides underlying the track flanges, anti-friction means disposed between the underside of said central slide web and the lower portion of said track, a latch movably mounted on said slide for movement substantially horizontally, an aperture portion in one side of said slide, said latch having a portion extending through said apertured portion and being movable between latching and unlatching positions, a series of apertured portions in the adjacent side wall of said track, and an auxiliary latching bracket extending downwardly from the underside of said central slide web between said track sides and having an apertured portion aligned with the apertured portion of said slide, said latch portion being of sufficient length to extend through a track aperture aligned therewith and through said bracket aperture when the latch is in its latching position but withdrawn from said track and bracket apertures when the latch is in an unlatching position, the apertured portions of said slide and bracket being closed at their lower ends, whereby the materials of said slide and bracket underlie said latch to prevent substantial upward movement of said slide when an upward force is exerted thereon.

2. The combination according to claim 1, said auxiliary latching bracket comprises an L-shaped member having an upper horizontal leg secured to the underside of said central slide web and a vertically extending leg having said apertured portion.

3. The combination according to claim 1, further provided with antifriction members disposed between the flanges of said track and slide.

4. The combination according to claim 3, said antifriction members comprising a pair of forward balls and a pair of rearward balls, forward and rear cages disposed between said track and said slide, each of said cages retaining one of said rollers and two of said balls.

5. In an automotive seat slide assembly, an elongated track having a central lower portion, sides extending upwardly from the opposite edges of said lower portion, and outwardly extending flanges at the upper ends of said sides, a slide having an upper central web portion above said flanges, sides extending downwardly past said flanges, and inwardly extending flanges at the lower ends of said sides underlying the track flanges, anti-friction means disposed between the underside of said central slide web and the lower portion of said track, a latch movably mounted on said slide, an apertured portion in one side of said slide, said latch having a portion extending through said apertured portion and being movable between latching and unlatching positions, a series of apertured portions in the adjacent side wall of said track, an auxiliary latching bracket extending downwardly from the underside of said central slide web between said track sides and having an apertured portion aligned with the apertured portion of said slide, said latch portion being of sufficient length to extend through a track aperture aligned therewith and through said bracket aperture when the latch is in its latching position but withdrawn from said track and bracket apertures when the latch is in an unlatching position, anti-friction members disposed between the flanges of said track and slide, said anti-friction members comprising a pair of forward balls and a pair of rearward balls, forward and rear cages disposed between said track and said slide, each of said cages retaining one of said rollers and two of said balls, a pair of load distributing members adjacent each of said rearward balls, one member being forward of its corresponding rearward ball and the other member rearwardly of it, each of said load distributing members comprising a cylinder of low friction material and having a slightly lesser diameter than the diameter of said balls, and means on said cage for carrying said load distributing members.

6. The combination according to claim 1, said latch being pivotally mounted on the central web of said slide and having a latch portion extending downwardly and then inwardly from the upper portion of said latch.

7. In an automotive seat slide assembly, a track having a central lower portion, upwardly extending sides on said lower portion and outwardly extending flanges at the upper ends of said sides, a slide comprising a central web above said track, sides extending downwardly on opposite sides of said track, and flanges extending inwardly under said track flanges, forward and rear rollers between said track and slide, a pair of forward balls and a pair of rearward balls between said track and slide flanges, forward and rearward cages for retaining said forward and rear roller and balls repectively, at least one load distributing member adjacent each of said rearward balls, each of said members comprising a cylinder of low friction material and of slightly lesser diameter than said balls, and means on said rearward cage for retaining said member in position.

8. The combination according to claim 7, said last-mentioned means comprising a curved portion on said cage, and a retaining portion on said member mounted within said curved cage portion and adjacent said ball.

9. The combination according to claim 7, each of said rearward balls having load distributing members forwardly and rearwardly of it, said rearward cage having a pair of curved portions on each side thereof, said pair of curved portions being on opposite sides of said rearward balls, and retaining portions on said load distributing members of lesser diameter than the main portions thereof and disposed within said curved portions of the cage.

10. In an automotive seat slide assembly, a track having a central lower portion, upwardly extending sides on said lower portion and outwardly extending flanges at the upper end of said sides, a slide comprising a central web above said track, sides extending downwardly on opposite sides of said track, and flanges extending inwardly under said track flanges, antifriction load bearing members between said track and slide, antifriction members between said track and slide flanges at the rearward ends thereof, at least one load distributing member adjacent each of said last-mentioned antifriction members, said load distributing members having a cross-sectional shape corresponding to the space between said track and slide flanges but being slightly smaller than said space, and means for maintaining each of said load distributing members in proximity to its corresponding antifriction member during movement of said slide along said track.

References Cited

UNITED STATES PATENTS

| | | | |
|---|---|---|---|
| 2,127,610 | 8/1938 | Moore | 248—430 |
| 3,171,698 | 3/1965 | Campbell | 308—3.8 |
| 3,204,916 | 9/1965 | Pickles | 248—429 |
| 3,279,737 | 10/1966 | Krause | 248—430 |

FOREIGN PATENTS 1,349,006  12/1963  France.

ROY D. FRAZIER, *Primary Examiner.*

R. P. SEITTER, *Assistant Examiner.*